United States Patent [19]
Danver et al.

[11] Patent Number: 5,253,222
[45] Date of Patent: Oct. 12, 1993

[54] OMNIDIRECTIONAL FIBER OPTIC HYDROPHONE

[75] Inventors: Bruce A. Danver, Tarzana; A. Douglas Meyer, West Hills, both of Calif.

[73] Assignee: Litton Systems, Inc., Beverly Hills, Calif.

[21] Appl. No.: 15,310

[22] Filed: Feb. 9, 1993

Related U.S. Application Data

[63] Continuation-in-part of Ser. No. 826,897, Jan. 28, 1992, abandoned.

[51] Int. Cl.[5] .................................................. G01B 9/02
[52] U.S. Cl. ........................................ 367/149; 356/345; 73/655; 250/227.14; 250/227.19; 250/227.27
[58] Field of Search ...................... 73/655; 250/227.14, 250/227.16, 227.25, 231.1, 231.19, 227.19, 227.27; 350/96.29; 356/345; 367/141, 149, 153

[56] References Cited

U.S. PATENT DOCUMENTS

| | | | |
|---|---|---|---|
| 2,964,730 | 12/1960 | Blanchard | 367/141 |
| 3,022,487 | 2/1962 | Manns | 367/141 |
| 4,525,818 | 6/1985 | Cielo et al. | 367/149 |
| 4,570,248 | 2/1986 | Assard | 367/149 |
| 4,799,202 | 1/1989 | Assard | 367/149 |
| 4,799,752 | 1/1989 | Carome | 367/149 X |
| 4,998,226 | 3/1991 | Henning et al. | 367/149 |

*Primary Examiner*—J. Woodrow Eldred
*Attorney, Agent, or Firm*—Elliott N. Kramsky

[57] ABSTRACT

An omnidirectional fiber optic hydrophone includes a concentrically-arranged pair of ring-shaped mandrels mounted between planar upper and base members. Each of the rings is formed of inner and outer annular portions separated by an annular void. Optical fibers wound about the outer circumference of the outer annular portion of the outer ring and about the outer circumference of the inner annular portion of the inner ring communicate with a source of optical energy and with a photodetector to provide signals for measuring acoustic wave-induced deflections of the rings. A plurality of mandrels may be employed in a single hydrophone which may be potted with elastomeric material or free flooded.

16 Claims, 4 Drawing Sheets

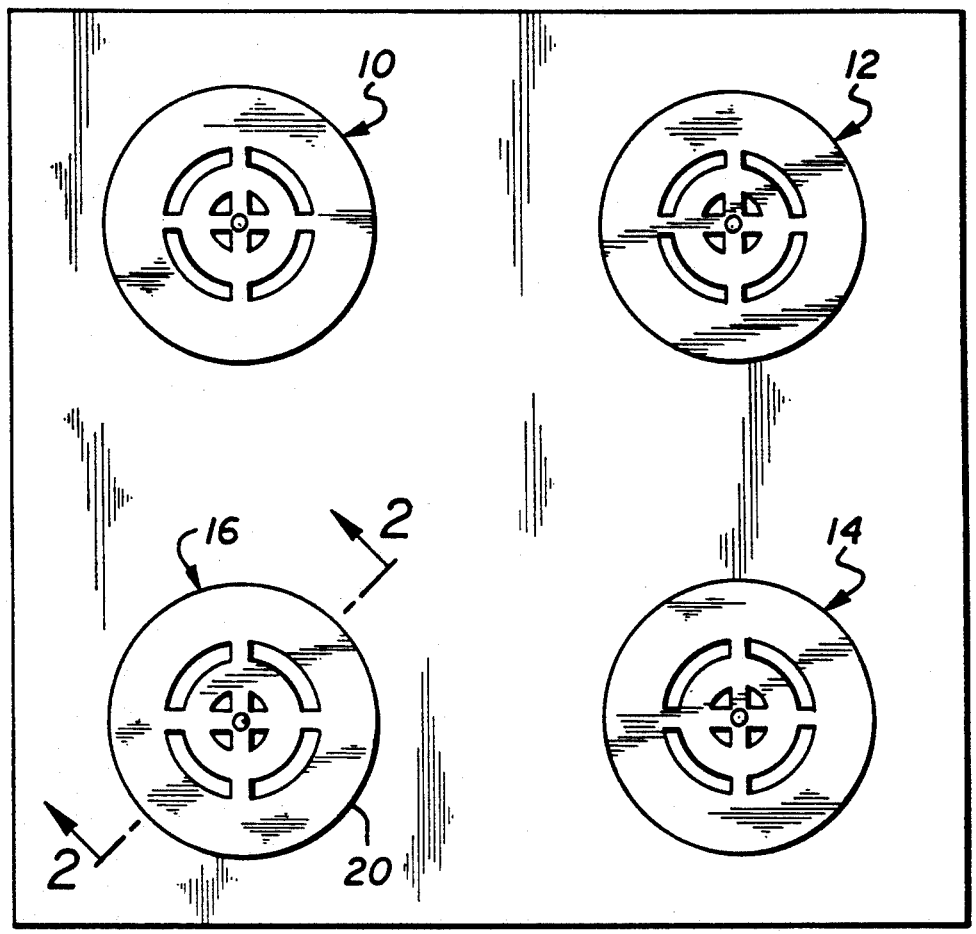
FIG. 1
FIG. 2
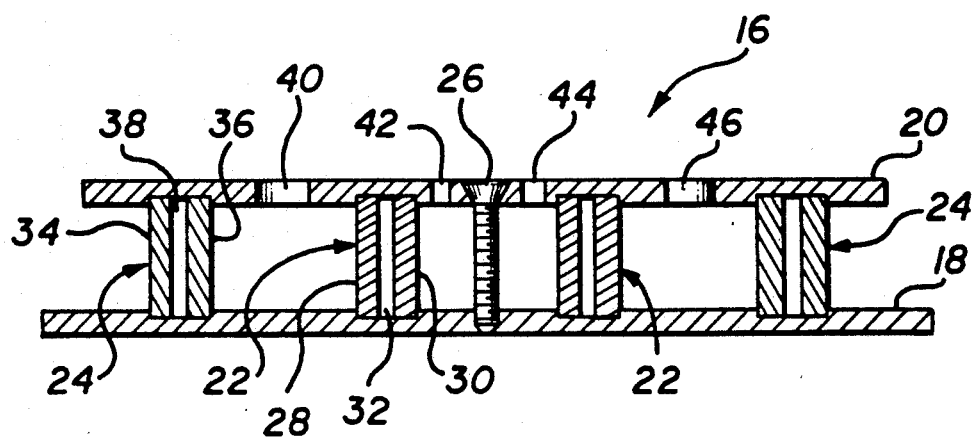

OMNIDIRECTIONAL FIBER OPTIC HYDROPHONE

This application is a continuation-in-part of application Ser. No. 07/826,897, filed Jan. 28, 1992 now abandoned.

BACKGROUND

1. Field of the Invention

The present invention relates to hydrophones of the type that utilize an optical indication of acoustic pressure. More particularly, this invention pertains to an omnidirectional fiber optic hydrophone that is substantially insensitive to transverse acceleration forces.

2. Description of the Prior Art

The hydrophone is an instrument for measuring acoustic signals in a fluid body, acting as a transducer for converting acoustic wave pressure into a measurable signal. Such signal can then be processed to identify and locate an object within the fluid body. The frequency of the signal, corresponding to the acoustic wave frequency, may identify, for example, a submarine propeller within the detection range.

Hydrophones of the type that generate an electrical signal in response to detected acoustic signals employ an electrically-active element such as a piezoceramic or poly-vinyl-difluride ($PVF_2$, an electrically active polymer) to convert the acoustic input to the signal. These devices convert the incident acoustic pressure into a voltage that varies with the magnitude and the frequency of the incident acoustic wave fronts.

The generally high electrical impedance of hydrophones of the electrical type requires preamplifiers located near the transducer (the sensing element) for transmitting the electrical signal to the ship via the data bus, necessitating the supply of electrical power to the preamplifier/transducer assembly. In addition to adding complexity, weight and cost to the outboard system, electrical hydrophone systems are subject to failure when the wet-end subassembly is breached and exposed to a seawater environment. The multiple sensors required for detection and localization of quieter acoustic signals further complicate matters by requiring a larger data bus transmission bandwidth and associated bit error requirement. This results in an increase in the weight of the ship due to the additional sensors, associated preamplifiers and cabling required. Finally, such systems are prone to extraneous electromagnetic pickup and interference.

Fiber optic hydrophone technology offers a number of advantages. Fiber optic systems are electrically passive and do not risk exposure of electronics to an undersea environment. Since the sensor is an optical device, an all-optical telemetry (data bus) system is easily implemented. By employing a completely optical detection and telemetry system, extraneous electromagnetic pickup is eliminated. An increase in telemetry bandwidth (high detection bandwidth and/or increased sensor count per line) follows from the use of optical frequency energy. Additionally, a reduction in weight is realized by the elimination of any need for preamplifiers and associated power supplies.

A common fiber optic hydrophone comprises a flat spiral of optical fiber potted in a planar polyurethane base. This omnidirectional sensor is subject to a significant amount of sensitivity to tranverse acceleration forces as a consequence of the susceptibility of the relatively-flimsy planar device to stressing. The acceleration force effectively contaminates the optical signal detected by the fiber spiral. Since it does not possess acceleration cancelling properties, accelerometers must be mounted to the ship's hull to measure the forces that are then modeled (insofar as possible) out of the data.

The utility of the prior art fiber optic hydrophone of the above-identified type is greatly compromised by the additional hardware and signal processing required to null the significant effects of transverse acceleration. Furthermore, exact nulling of acceleration effects is essentially impossible as the hull-mounted accelerometers are unavoidably located at some distance from the hydrophone itself.

SUMMARY OF THE INVENTION

The present invention addresses and overcomes the foregoing disadvantages of the prior art by providing an omnidirectional hydrophone. The hydrophone of the invention includes at least one mandrel that includes a first ring and a second ring, such rings being of substantially equal axial length. The diameter of the first ring exceeds that of the second ring. A planar base member is provided. The first and second rings are sealably mounted concentrically upon the base member. Each of the first and second rings comprises an inner annulus and an outer annulus. The inner and outer annulus in each instance is mounted concentrically upon the base member in spaced relationship whereby each of the rings has an annular void space. A planar upper member is provided in space relationship to the base member. The upper portions of the rings are sealably fixed to the underside of the upper member and means, engaged to the rings, are provided for measuring the deflection thereof in response to acoustic pressure.

The foregoing and additional features and advantages of this invention will become apparent from the detailed description that follows. Such detailed description is accompanied by a set of drawing figures. Numerals of the drawing figures, corresponding to those of the written description, point to the features of the invention, like numerals referring to like features throughout both the written description and the drawing figures.

BRIEF DESCRIPTION OF THE DRAWINGS

FIG. 1 is a top plan view of a hydrophone in accordance with the invention including a plurality of mandrels;

FIG. 2 is a cross-sectional view in elevation of a mandrel taken at line 2—2 of FIG. 1;

DETAILED DESCRIPTION

Figure 3:
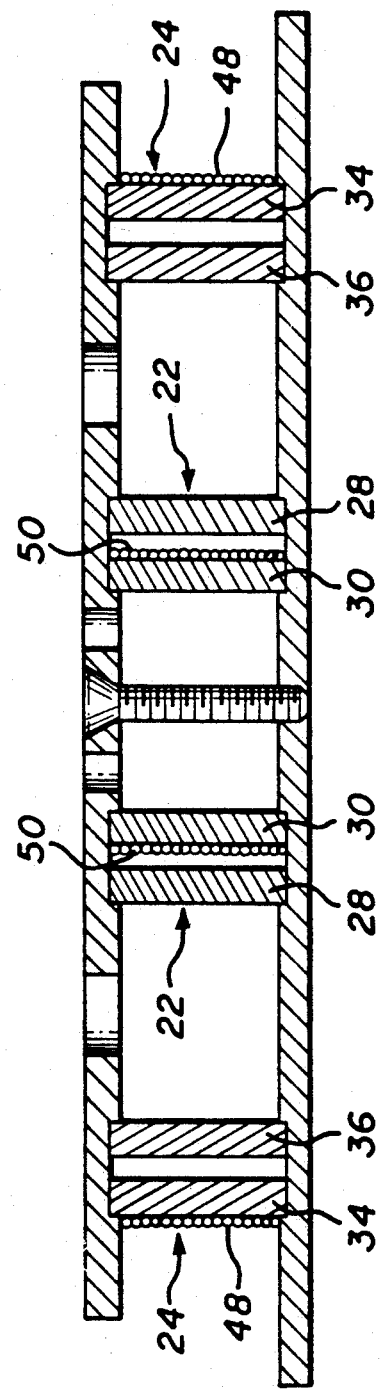
FIG. 3 is an enlarged cross-sectional view of a mandrel including inner ring and outer ring optical fiber windings.

Turning to the drawings, FIG. 1 is a top plan view of a hydrophone in accordance with the invention incorporating mandrels 10, 12, 14 and 16. The mandrels are positioned upon a common planar base member 18 that may comprise, for example, an aluminum alloy. The base member 18 might be directly fixed to the hull of a ship in use, permitting free-flooded operation. As mentioned earlier, the hydrophone, being a fiber optic and not an electrical device, is not subject to catastrophic failure when breached. Alternatively, as shown in a succeeding figure, the device may be encapsulated in potting material in operation.

The optical fiber wiring of the hydrophone is not shown in FIG. 1. Rather, the fiber has been removed for clarity. Further, while the device is illustrated in conjunction with multiple mandrels, the benefits of the invention may be realized in a single mandrel device.

FIG. 2 is a cross-sectional elevation view of a mandrel in accordance with the invention taken at line 2—2 of FIG. 1. As shown, an upper planar sealing member 20, shown in FIG. 1 to include a pair of concentric planar rings, sits atop and caps upstanding inner and outer rings 22 and 24 respectively. The rings 22 and 24 are arranged concentrically about a central fastener or screw 26 that secures the sealing cap 20 in spaced relation to the base plate 18 with the inner and outer rings 22 and 24 acting as spacers.

As can be seen, each of the upstanding rings 22 and 24 comprises an assembly of inner and outer annular members separated by a void or air space. That is, the inner ring 22 comprises an outer annular member 28 and an inner annular member 30 separated by a void 32. Similarly, the outer ring 24 comprises an outer annular member 34 and an inner annular member 36 separated by an air space 38.

Grooves (not shown) are provided in the upper planar member 20 and in the planar base member 18 for accepting the inner and outer rings 22 and 24 respectively. Additionally, the rings are fixed within the grooves by means of an appropriate adhesive to maintain the integrity of the voids or air spaces 32 and 38. Apertures 40, 42, 44 and 46 in the upper planar member 20 and apertures (not shown) in the base plate 18 are provided for permitting the essential communication between the hydrophone and the environment (regardless of whether the hydrophone is full-flooded or encapsulated) to assure sensitivity to the surrounding environment.

FIG. 3 is an enlarged cross-sectional view in elevation of a mandrel as in the preceding figure with fiber optic windings in place. As can be seen, a first winding 48 (comprising one or more layers of fiber) encircles the circumference of the outer annular member 34 of the outer ring 24 while a second fiber winding 50 (again comprising one or more layers of optical fiber) encircles the circumference of the inner annular member 30 of the inner ring 22. As will become apparent, the arrangement of windings, in conjunction with the structure of the mandrel, results in a push-pull relationship whereby an active reference signal is provided. This effectively doubles the sensitivity to acoustic forces.

Figure 4:
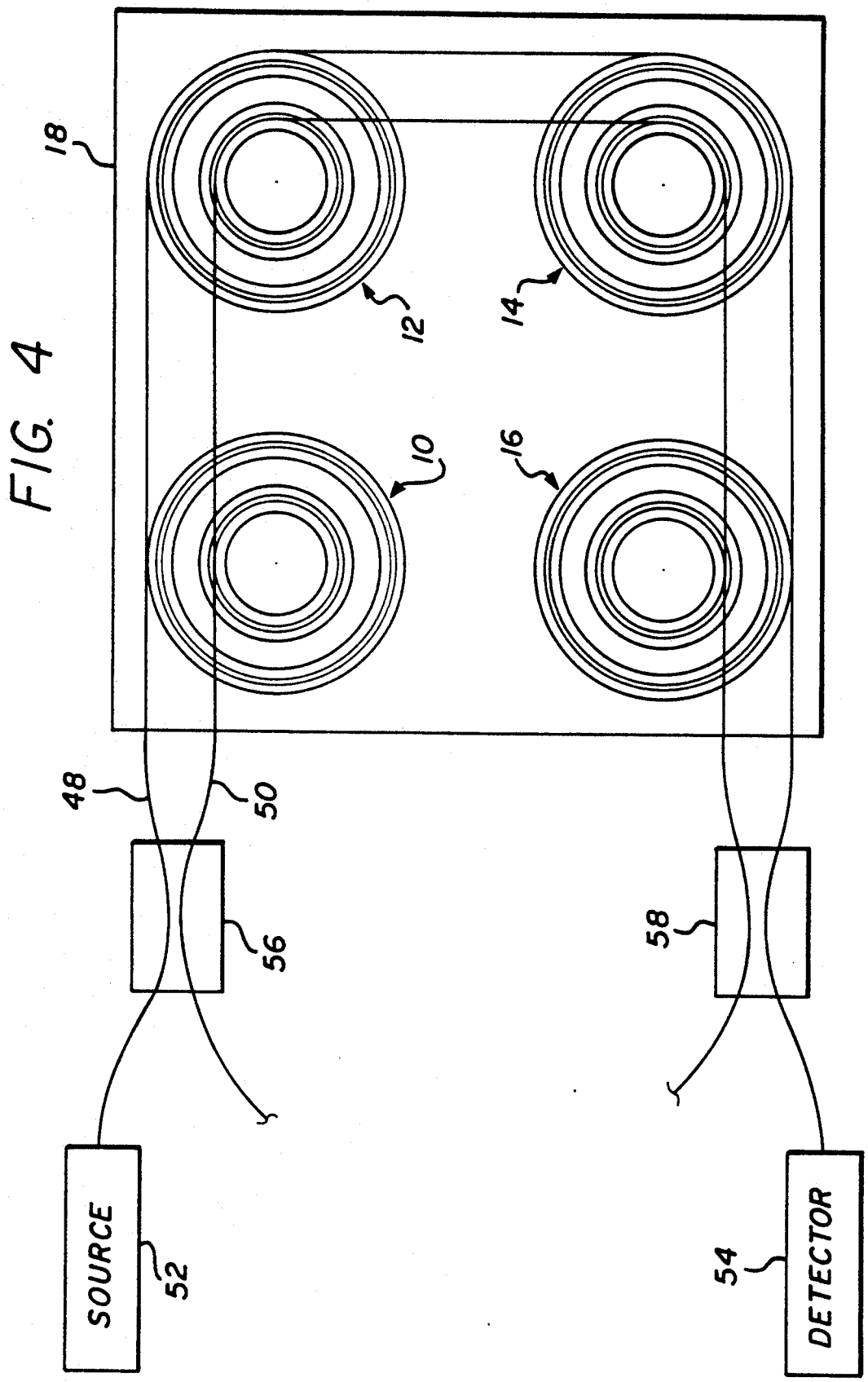
FIG. 4 is a schematic and top plan view of the invention with planar upper sealing members removed for purposes of clarity to illustrate the fiber interconnections or wiring of a multiple mandrel hydrophone in accordance with the invention.
Figure 6:
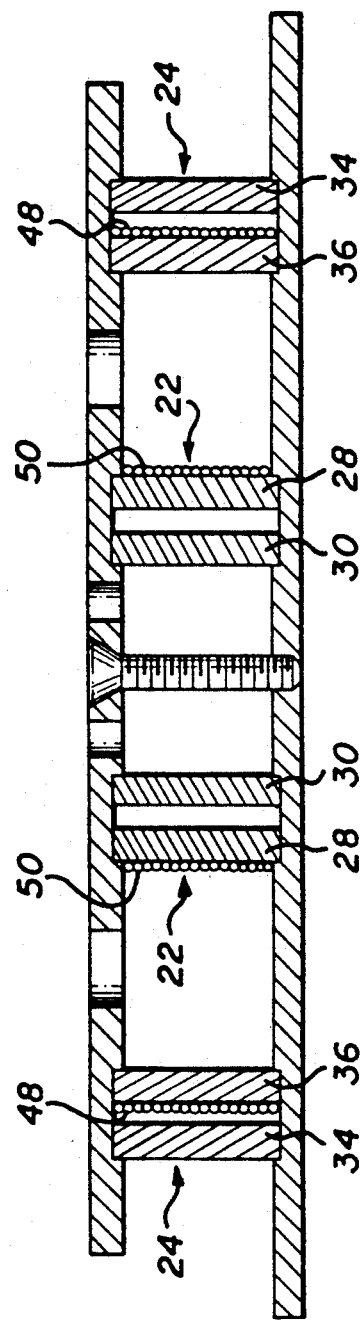
FIGS. 6 and 7 are cross sectional views of mandrels of the invention in accordance with alternative fiber winding patterns.
Figure 7:
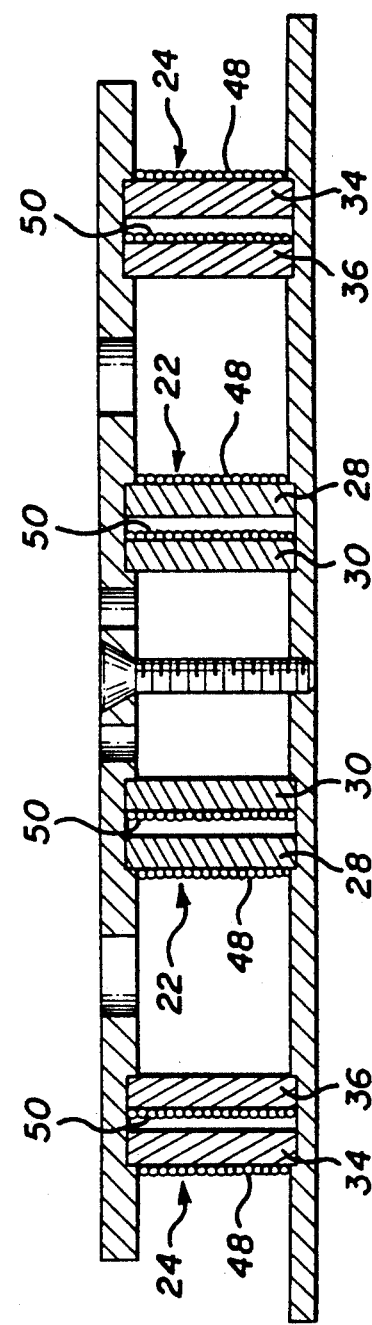

FIG. 4 is a winding diagram, corresponding to the mandrel winding pattern of the preceding figure, for an optomechanical hydrophone embodiment that utilizes a plurality of mandrels mounted on a common base plate 18. As illustrated in this figure, the upper planar members of the mandrels 10, 12, 14 and 16 have been removed, revealing the concentric inner and outer rings (and, for that matter, the concentric inner and outer annular members that comprise each of those rings) discussed above. Each of the first and second windings 48 and 50 respectively comprises a single continuous optical fiber. The first winding fiber 48 proceeds consecutively from the circumference of the outer annular member of the outer ring of the mandrel 10 to that of the mandrel 12 and so forth. The second optical fiber 50 is similarly wound consecutively about the circumferences of the inner annular members of the inner rings of the mandrels 10, 12 and 14 and 16. While the version illustrated includes four mandrels, this arrangement is not intended to imply that four mandrels or that a symmetrical arrangement is required or always desirable. Rather, other applications may call for other numbers of mandrels (or, for that matter, a single mandrel) arranged in varying configurations about a base plate. Further, the particular sequence and pattern for winding the optical fibers 48 and 50 may vary from that as illustrated in accordance with the designated application. For example, alternative mandrel winding patterns are indicated in FIGS. 6 and 7. In the mandrel winding pattern of FIG. 6, the fiber 48 is wound about the inner annular member 36 of the outer ring 24 while the fiber 50 is wound about the outer annular member 28 of the inner ring 22. Again, a push-pull relationship is obtained in which the sensitivity to acoustic forces is doubled. In FIG. 7 the fiber 48 is wound about the outer annular member 34 of the outer ring 24 and the outer annular member 28 of the inner ring 22 while the fiber 50 is wound about the inner annular member 36 of the outer ring 24 and the inner annular member 30 of the inner ring 22. While such a winding pattern requires twice the fiber of the winding patterns of either FIG. 3 or FIG. 6, it generates an output signal whose sensitivity to acoustic forces is double that of either of such embodiments.

The optical circuit of the acoustic wave detection system includes a source of optical energy 52, a photodetector 54 and couplers 56 and 58, the first coupler acting to launch in-phase optical signals along the fibers 48 and 50 and the second serving to combine the differentially phase-shifted output signals prior to application to the photodetector 54. The measured phase shift or retardation between the signals after transmission from the source 52 provides an indication of the acoustic wave pressures exerted upon the inner and outer rings of the mandrel(s) of the hydrophone.

Figure 5:
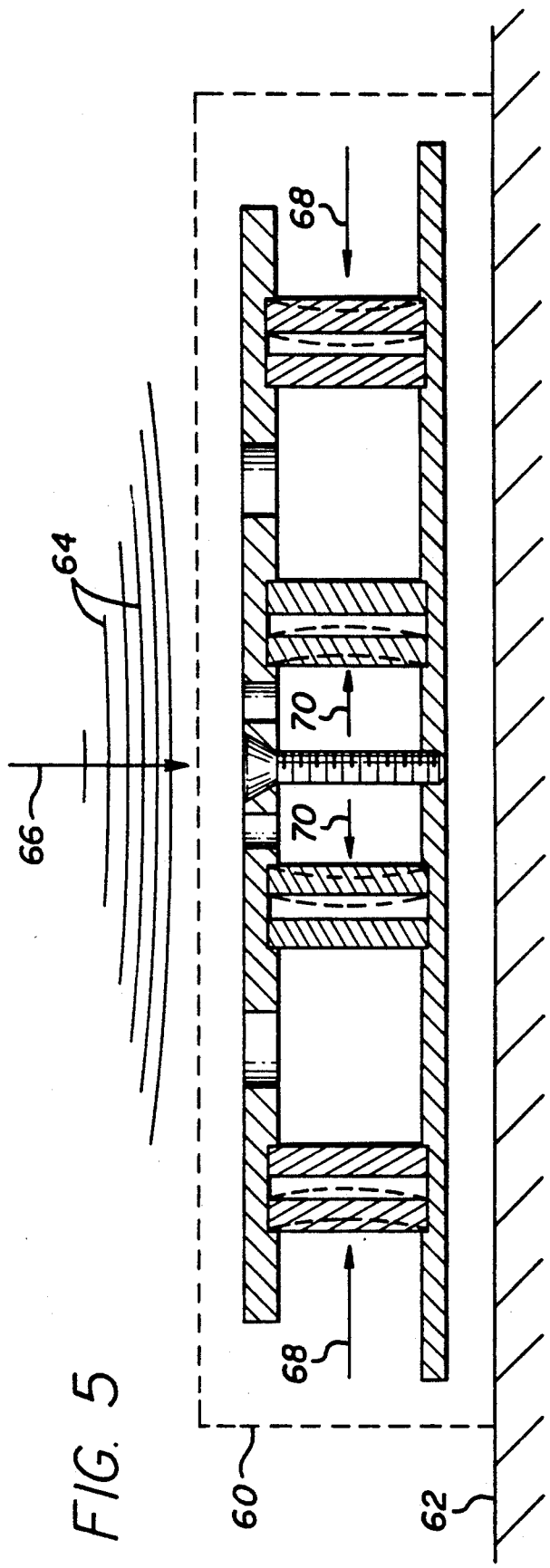
FIG. 5 is a cross-sectional view of a mandrel in accordance with the invention encapsulated in an elastomeric potting material for illustrating the effect of acoustic forces upon the inner and outer rings.

FIG. 5 is a cross-sectional elevation view of a mandrel in operation. For purposes of clarity, the fiber optic windings have been removed and only the deflections of the portions of the inner and outer rings 22 and 24 respectively that contribute to the output signal detected by a hydrophone wound in accordance with the fiber winding pattern of FIGS. 3 and 4 are shown in shadow outline. Further, the mandrel as illustrated in FIG. 5 is encapsulated in a block 60 (shown in shadow view) of an appropriate elastomeric material such as polyurethane. An encapsulation is often appropriate and preferable to free-flooded operation in view of the corrosive ocean environment.

As shown, the polyurethane block encapsulation is mounted to the hull 62 of a ship. An acoustic wavefront 64 propagating in the direction 66 impinges the polyurethane block 60 as shown. As a first aside, the inner and outer rings 22 and 24, whose deflections generate the output signal for measurement in accordance the mandrel fiber winding pattern of FIGS. 3 and 4, are arranged parallel to the transversely-directed force, thus stiffening the mandrel against the significant signal contamination resulting from transverse acceleration forces in prior art devices.

The force exerted by the wave front 64 is transformed, in accordance with the modulus of the material of the block 60, into equal and opposite laterally acting forces 68, 68' and 70, 70' as shown. The relationship between the transversely-acting wavefront 64 and the lateral forces and is determined by the Poisson's ratio of the potting material.

As shown in shadow view in FIG. 5, the circumference of the outer annular member of the outer ring 24 and that of the inner annular member of the inner ring 22 are bowed in opposite directions in response to the forces 68 and 70. This occurs as a consequence of the immersion of the mandrel in an encapsulating potting material or directly into the fluid body. The only portion of the device shown in FIG. 5 that is not filled with potting material (or, in the case of a flooded hydrophone, with fluid) are the air gaps or voids 32 and 38. The outwardly acting force 70 at the center of the mandrel compresses the inner annular member of the inner ring while the inwardly-acting force 68 acts upon the outer annular member of the outer ring to bow that member inwardly. For purposes of clarity, the outward bowing of the inner annular member 36 of the outer ring and the inward bowing of the outer annular member 18 of the inner ring 22 are not shown as such motions do not contribute to the signal generated in accordance with the mandrel winding pattern of FIGS. 3 and 4. Such deflections provide the entire output signal for a hydrophone with mandrel winding pattern in accordance with FIG. 6 while all of the deflections contribute to the push-pull output obtained by means of a hydrophone in accordance with the invention with mandrels wound according to FIG. 7.

The net result of the forces illustrated in FIG. 5 is to produce equal and opposite stressings of the fibers 48 and 50. Such stressings result in equal and opposite effects upon the optical birefringences of the two fibers. Referring back to FIG. 4, the optical signal detected at the photodetector 54 will thus exhibit a phase shift or retardation that is double the amount which would be detected with a passive reference (i.e. no push-pull relationship between the rings 22 and 24.)

Thus, as can be seen, the present invention provides an improved fiber optic hydrophone. By employing mandrels of ring-like but non-planar design, the device is substantially stiffened against transverse acceleration forces that could otherwise contaminate the hydrophone output signal. Furthermore, by providing a push-pull arrangement, the sensitivity of the hydrophone is further enhanced.

While this invention has been described in its presently preferred embodiment it is not limited thereto. Rather, this invention is limited only insofar as defined by the following set of patent claims and includes within its scope all equivalents thereof.

What is claimed is:

1. An omnidirectional hydrophone comprising, in combination:
    a) at least one mandrel, said mandrel including a first ring and a second ring, said rings being of substantially equal axial length and the diameter of said first ring exceeding the diameter of said second ring;
    b) a planar base member;
    c) said first and second rings being sealably mounted concentrically upon said base member;
    d) each of said first and second rings comprising an inner annulus and an outer annulus, said inner and outer annulus in each instance being mounted concentrically upon said base member in spaced relationship defining in each case an annular void space of of equal height therebetween;
    e) a planar upper member in spaced relationship to said base member;
    f) the upper portions of said rings being sealably fixed tot he underside of said upper member;
    g) a first optical fiber having an intermediate portion wound about the outer circumference of the outer annulus of said first ring;
    h) a second optical fiber having an intermediate portion wound about the outer circumference of the inner annulus of said second ring; and
    i) the end portions of said optical fibers being in optical communication with a source of optical energy and a photodetector.

2. An omnidirectional hydrophone as defined in claim 1 further including:
    a) plurality of mandrels mounted upon said base member;
    b) intermediate portions of said first fiber are continuously wound about the outer circumferences of the outer annuluses of each of said first rings; and
    c) intermediate portions of said second fiber are continuously wound about the outer circumferences of the outer annuluses of each of said second rings.

3. An omnidirectional hydrophone as defined in claim 1 further including at least one fastener for securing said upper planar member in spaced relationship to said base member.

4. An omnidirectional hydrophone as defined in claim 1 wherein said planar upper member is of annular shape.

5. An omnidirectional hydrophone as defined in claim 4 further including at least one aperture in said planar upper member for accessing the interior of said second ring.

6. An omnidirectional hydrophone as defined in claim 5 further characterized in that said hydrophone is potted with an elastomeric material.

7. An omnidirectional hydrophone as defined in claim 6 wherein said elastomeric material is polyurethane.

8. An omnidirectional hydrophone as defined in claim 5 wherein said hydrophone is free flooded in a fluid.

9. An omnidirectional hydrophone as defined in claim 5 wherein said fluid is water.

10. An omnidirectional hydrophone as defined in claim 8 further characterized in that said rings, said planar base member and said planar upper member are of aluminum alloy fabrication.

11. An omnidirectional hydrophone comprising, in combination:
    a) at least one mandrel, said mandrel including a first ring and a second ring, said rings being of substantially equal axial length and the diameter of said first ring exceeding the diameter of said second ring;
    b) a planar base member;
    c) said first and second rings being sealably mounted concentrically upon said base member;
    d) each of said first and second rings comprising an inner annulus and an outer annulus, said inner and outer annulus in each instance being mounted concentrically upon said base member in spaced relationship defining in each case an annular void space of equal height therebetween;

e) a planar upper member in spaced relationship to said base member;

f) the upper portions of said rings being sealably fixed to the underside of said upper member;

g) a first optical fiber having an intermediate portion wound about the outer circumference of the inner annulus of said first ring;

h) a second optical fiber having an intermediate portion wound about the outer circumference of the outer annulus of said second ring; and i) the end portions of said optical fibers being in optical communication with a source of optical energy and a photodetector.

12. An omnidirectional hydrophone comprising, in combination:

a) at least one mandrel, said mandrel including a first ring and a second ring, said rings being of substantially equal axial length and the diameter of said first ring exceeding the diameter of said second ring;

b) a planar base member;

c) said first and second rings being sealably mounted concentrically upon said base member;

d) each of said first and second rings comprising an inner annulus and an outer annulus, said inner and outer annulus in each instance being mounted concentrically upon said base member in spaced relationship defining in each case an annular void space of equal height therebetween;

e) a planar upper member in spaced relationship to said base member;

f) the upper portions of said rings being sealably fixed to the underside of said upper member;

g) a first optical fiber having an intermediate portion wound about the outer circumference of the outer annulus of said first ring and the outer circumference of the outer annulus of said second ring;

h) a second optical fiber having an intermediate portion wound about the outer circumference of the inner annulus of said first ring and the outer circumference of the inner annulus of said second ring; and i) the end portions of said optical fibers being in optical communication with a source of optical energy and a photodetector.

13. An omnidirectional hydrophone as defined in claim 11 further including:

a) a plurality of mandrels mounted upon said base member;

b) intermediate portions of said first fiber are continuously wound about the outer circumferences of the inner annuluses of each of said first rings; and c) intermediate portions of said second fiber are continuously wound about the outer circumferences of the outer annuluses of each of said second rings.

14. An omnidirectional hydrophone as defined in claim 12 further including:

a) a plurality of mandrels mounted upon said base member;

b) intermediate portions of said first fiber are continuously wound about the outer circumferences of the outer annuluses of said first and second rings of said mandrels; and c) intermediate portions of said second fiber are continuously wound about the outer circumferences of the inner annuluses of said first and second rings of said mandrels.

15. An omnidirectional hydrophone as defined in claim 11 further including at least one aperture in said planar upper member for accessing the annular region formed between said first and second rings.

16. An omnidirectional hydrophone as defined in claim 12 further including at least one aperture in said planar upper member for accessing the annular region formed between said first and second rings and at least one aperture in said planar upper member for accessing the interior of said second ring.

* * * * *